United States Patent

Komatsuzaki et al.

[11] Patent Number: 5,943,520
[45] Date of Patent: Aug. 24, 1999

[54] CAMERA HAVING A SLIDE CASE

[75] Inventors: Hiroshi Komatsuzaki, Saitama; Kazuhisa Horikiri, Tokyo, both of Japan

[73] Assignee: Fuji Photo Film Co., Ltd., Kanagawa, Japan

[21] Appl. No.: 08/941,571

[22] Filed: Sep. 30, 1997

[30] Foreign Application Priority Data

Oct. 1, 1996 [JP] Japan ................................ 8-260790
Oct. 1, 1996 [JP] Japan ................................ 8-260791

[51] Int. Cl.⁶ .......................... G03B 15/03; G03B 17/04
[52] U.S. Cl. ........................ 396/448; 396/538; 396/539; 396/177
[58] Field of Search .................................. 396/535, 538, 396/539, 348, 349, 176, 177, 439, 448

[56] References Cited

U.S. PATENT DOCUMENTS

| | | | |
|---|---|---|---|
| 3,732,795 | 5/1973 | Fukuda et al. | 396/348 |
| 4,519,687 | 5/1985 | Kuge | 396/538 |
| 4,597,657 | 7/1986 | Wakabayashi | 396/348 X |
| 4,601,562 | 7/1986 | Yoneyama et al. | 396/535 |
| 5,606,389 | 2/1997 | Sugita | 396/539 X |
| 5,758,211 | 5/1998 | Miyamoto | 396/176 |

FOREIGN PATENT DOCUMENTS 60-60731  4/1985  Japan.
7-295048  11/1995  Japan.

*Primary Examiner*—Safet Metjahic
*Assistant Examiner*—J. K. Han
*Attorney, Agent, or Firm*—Young & Thompson

[57] ABSTRACT

A camera has a slide case for covering a taking lens of the camera. The slide case is slidably attached to a camera body and is set at an unused position, a photographing position, a battery exchange position and a cartridge exchange position. When the slide case is set at the cartridge exchange position, a cartridge lid of a cartridge chamber is openable so that a film cartridge is exchangeable. When the slid case is set at the unused position, the photographing position or the battery exchange position, the slide case covers at least a part of the cartridge lid so that it is impossible to open the cartridge lid. A lock mechanism of the cartridge lid is simplified so that the size of the camera may be reduced. A battery chamber for containing a battery is disposed above an exposure aperture and close thereto so that the height of the camera may be lowered.

18 Claims, 13 Drawing Sheets

CAMERA HAVING A SLIDE CASE

BACKGROUND OF THE INVENTION

1. Field of the Invention

The present invention relates to a camera, and more particularly to a camera having a slide case which protects a taking lens and is slidable.

2. Description of the Related Art

Recently, an IX240-type film cartridge has been manufactured and sold. When the IX240-type film cartridge is unused, all of a photographic film is contained therein so that the film cartridge is easily loaded in a camera and so forth. After loading the film cartridge, a spool of the film cartridge is rotated to advance the photographic film from a cartridge shell. The photographic film contained in the IX240-type film cartridge has a smaller frame area than a conventional 135-type photographic film and uses a thin film base. Accordingly, the cartridge shell of the IX240-type film cartridge is smaller than a 135-type film cassette.

A camera and a lens-fitted film unit are furthered sized relative to its miniaturization in order to improve portability thereof and so forth. Some cameras employing the 135-type film cassette have a size approximating a cigarette pack. A camera employing the IX240-type film cartridge and having a similar size to the above cameras is on sale. As to the camera employing the IX240-type film cartridge, it is possible to further reduce its size by disposing inside parts thereof properly.

A small size camera excels in portability. However, there arise problems in that it is difficult to hold the small size camera when a photograph is taken, and that photographing sometimes fails by resting a finger on a taking lens or a flash unit. In order to solve the problems, inventions in which protrusions are provided around the taking lens and the flash unit to warn a photographer of the resting finger have been made. However, it is not preferable to provide the protrusion around the taking lens and the flash unit in view of design. Further, it is not effective to provide the protrusion.

Moreover, a camera having a slide case is disclosed in Japanese Utility Model Laid-Open Publication No. 60-60731. The slide case covering the taking lens, the flash unit and a shutter button is provided on a camera body to which a photographing mechanism is attached. The slide case is used as a grip to hold the camera body when the slide case is slid in a direction that the taking lens and the flash unit emerge to the outside. However, the slide case of the camera is provided with an opening for exposing the flash unit at a center thereof so that there is a problem that dust and the like tend to enter between the camera body and the slide case.

Further, the IX240-type film cartridge uses a rod-like light shielding lid for shielding light entering into a film mouth. If the film cartridge is exposed to light in a state that the light shielding lid is opened, all of the photographic film contained in the film cartridge is exposed to the light. Thus, a cover member for opening and closing a cartridge chamber in which the film cartridge is contained includes a lock mechanism. The lock mechanism inhibits the cover member from opening when the light shielding lid is opened. However, the lock mechanism prevents the camera from reducing its size and decreasing the cost.

As stated above, the camera adapted to the IX240-type film cartridge, namely, to the new system is on sale. The new system is called advanced photo system. The film cartridge used in the new system is miniaturized by about 25% relative to its volume in comparison with the 135-type which is most popularized. Thus, many of the cameras adapted to the new system are smaller than the conventional camera. For example, "Canon IXY" (trade name) has a size of 90(width)×60(height) ×27(length) mm.

In this camera "Canon IXY" (trade name), a battery chamber is disposed under a film take-up chamber in order to reduce its size. Exchange of a battery as a power supply is carried out from a side of the camera. On the other hand, Japanese Patent Laid-Open Publication No. 7-295048 discloses an invention that camera size is reduced by disposing the battery chamber above the film take-up chamber.

By the way, the battery, for example, lithium-type CR2 generally used in the recent camera is shorter than the AA type battery but it is comparatively large so that the battery is disposed in a side portion or a corner of the camera, avoiding a center thereof. When the battery chamber is disposed above or under the film take-up chamber, it is possible to narrow the width of the camera. However, the height of the camera is controlled by total height of the film take-up chamber and the battery chamber. It is desired to contrive a suitable arrangement in order to further reduce the size of the camera.

SUMMARY OF THE INVENTION

In view of the foregoing, it is a primary object of the present invention to provide a camera whose size is reduced.

It is a second object of the present invention to provide a camera which is easy to hold at the time of photographing without losing portability.

It is a third object of the present invention to provide a low-cost camera.

In order to active the above and other objects, the camera according to the present invention comprises a slide case for covering a taking lens of the camera. The slide case is slidably attached to a camera body.

In a preferred embodiment, the slide case is set at an unused position, a photographing position, a battery exchange position and a cartridge exchange position. When the slide case is set at the unused position, the camera body is almost covered with the slide case.

When the slide case is set at the cartridge exchange position, a cartridge lid of a cartridge chamber is not covered with the slide case so that the cartridge lid is openable. Accordingly, a film cartridge contained in the cartridge chamber is exchangeable. When the slide case is set at the unused position, the photographing position or the battery exchange position, the slide case covers at least a part of the cartridge lid. Accordingly, it is impossible to open the cartridge lid so that the film cartridge is not exchangeable. As the slide case is use as a lock mechanism of the cartridge lid of the cartridge chamber, a complex lock mechanism thereof is not required. Therefore, the lock mechanism is simplified and the size of the camera may be reduced.

A battery chamber containing a battery as a power supply of the camera body is disposed above an exposure aperture. Further, the battery chamber is put close to the exposure aperture and overlaps with an edge of a photographic film which is out of an exposure area thereof. Accordingly, the height of the camera may be lowered.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 2:
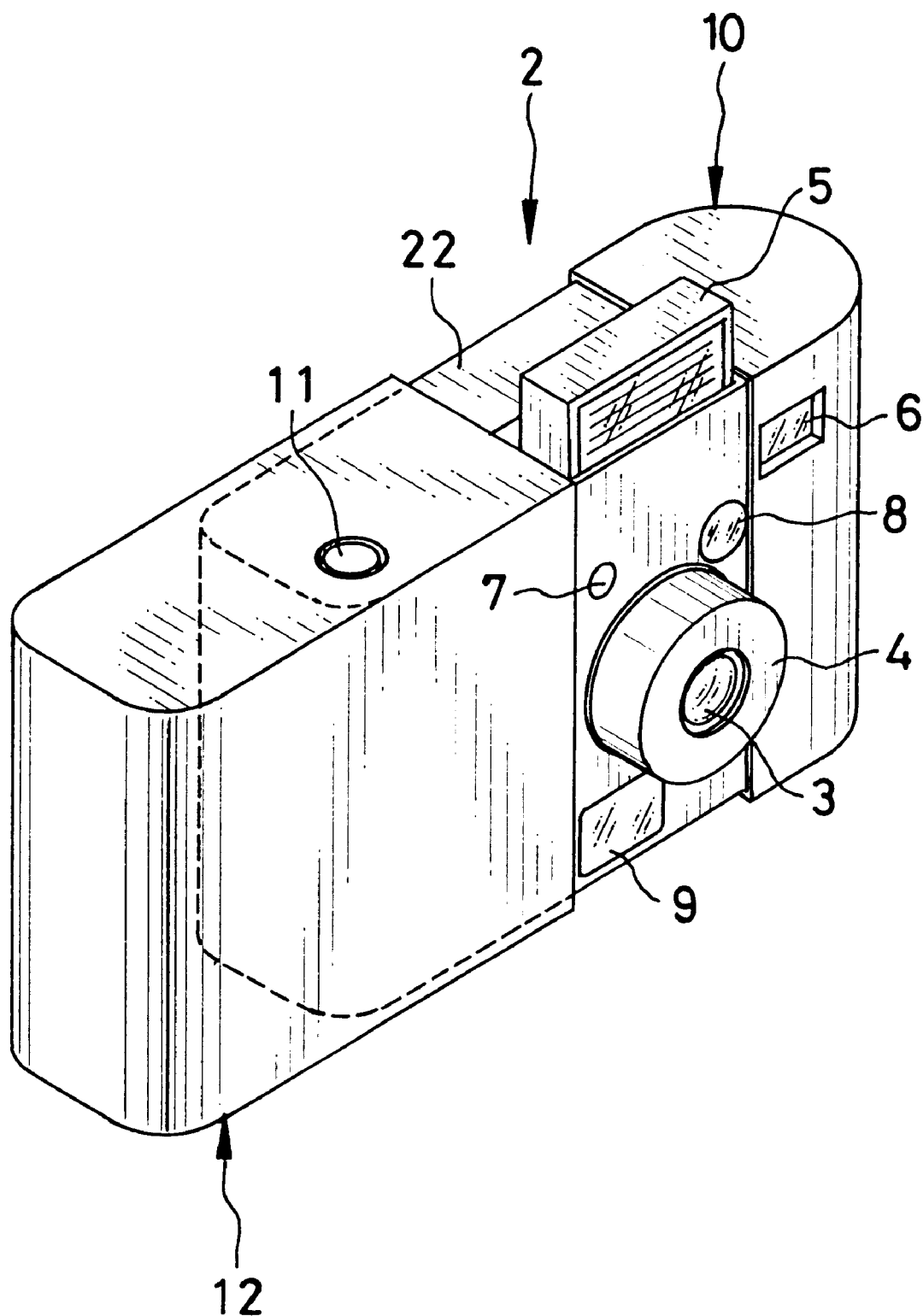
FIG. 2 is a perspective view of the camera when the slide case is set at the photographing position.

Hereinafter, the present invention is described on the basis of an embodiment shown in drawings. FIG. 2 is a perspective view showing a using state of a camera 2 according to the present invention. The camera 2 comprises a rectangle-like camera body 10 and a box-like slide case 12. The camera body 10 is provided with a lens barrel 4 for holding a taking lens 3, a flash unit 5, a viewfinder 6, a photometric window 7, a light emitting window 8 and a light receiving window 9 for measuring a distance, and so forth. The light emitting window 8 and the light receiving window 9 constitute a distance measuring device. The slide case 12 is attached to an outside of the camera body 10 so as to cover it and has a shutter button 11 provided on an upper face thereof.

Figure 3:
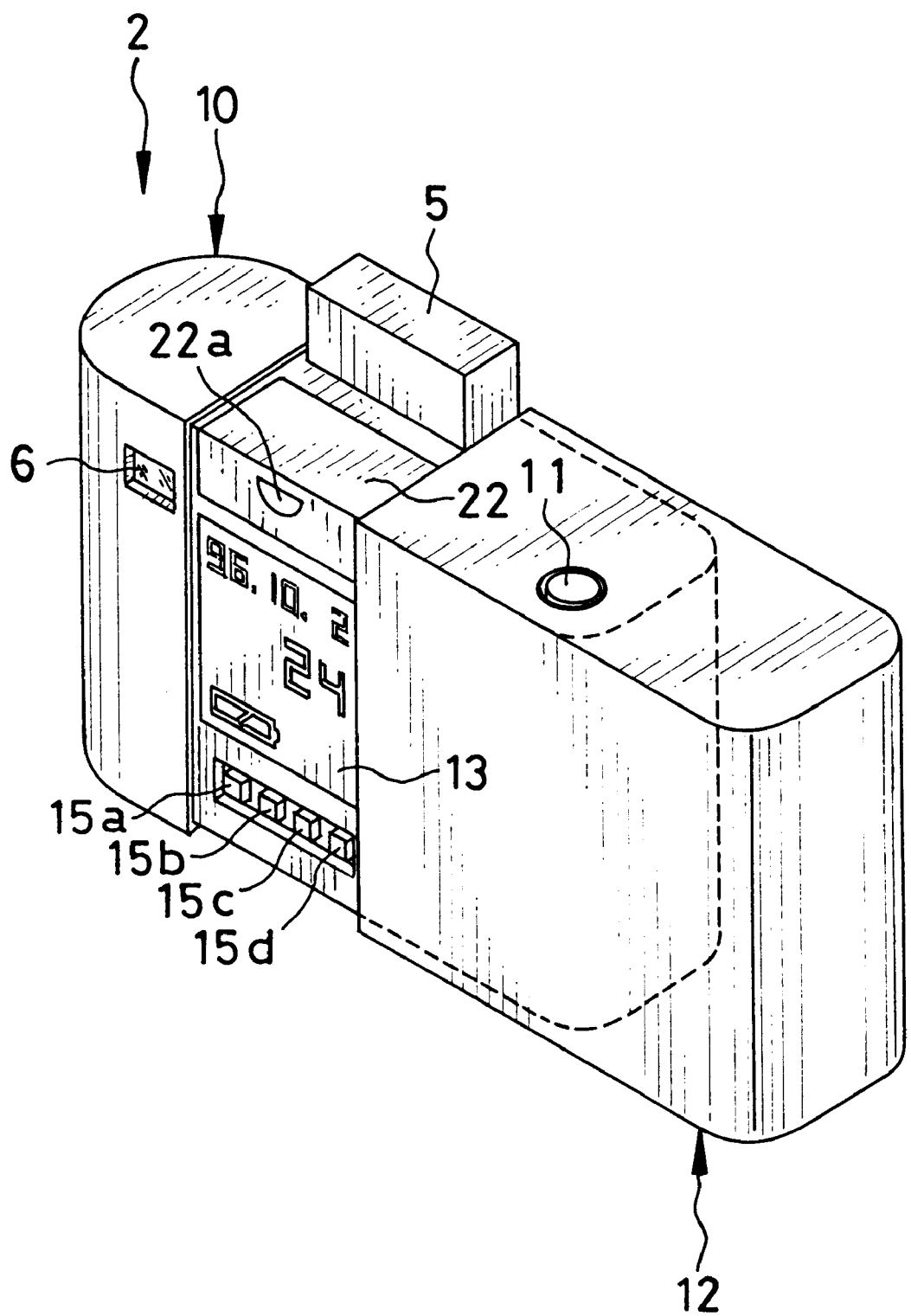
FIG. 3 is a perspective view of the rear side of the camera when the slide case is set at the photographing position.

As shown in FIG. 3 illustrating a rear side of the camera 2, a large-sized liquid crystal display 13 and switch buttons 15a to 15d are provided on a rear face of the camera body 10. The liquid crystal display 13 indicates a date, a photograph number, a photographing mode and so forth. The switch buttons 15a to 15d are disposed under the liquid crystal display 13 and used for changing and setting of the date, the photographing mode and so forth. Incidentally, the liquid crystal display 13 having a larger size may be used to provide touch sensors having a similar function to the switch buttons 15a to 15d. The touch sensor is provided at any position of the liquid crystal display 13. In this case, the switch buttons may be omitted. Accordingly, ruggedness is removed from the rear face of the camera body so that the its design becomes simple.

Figure 4:
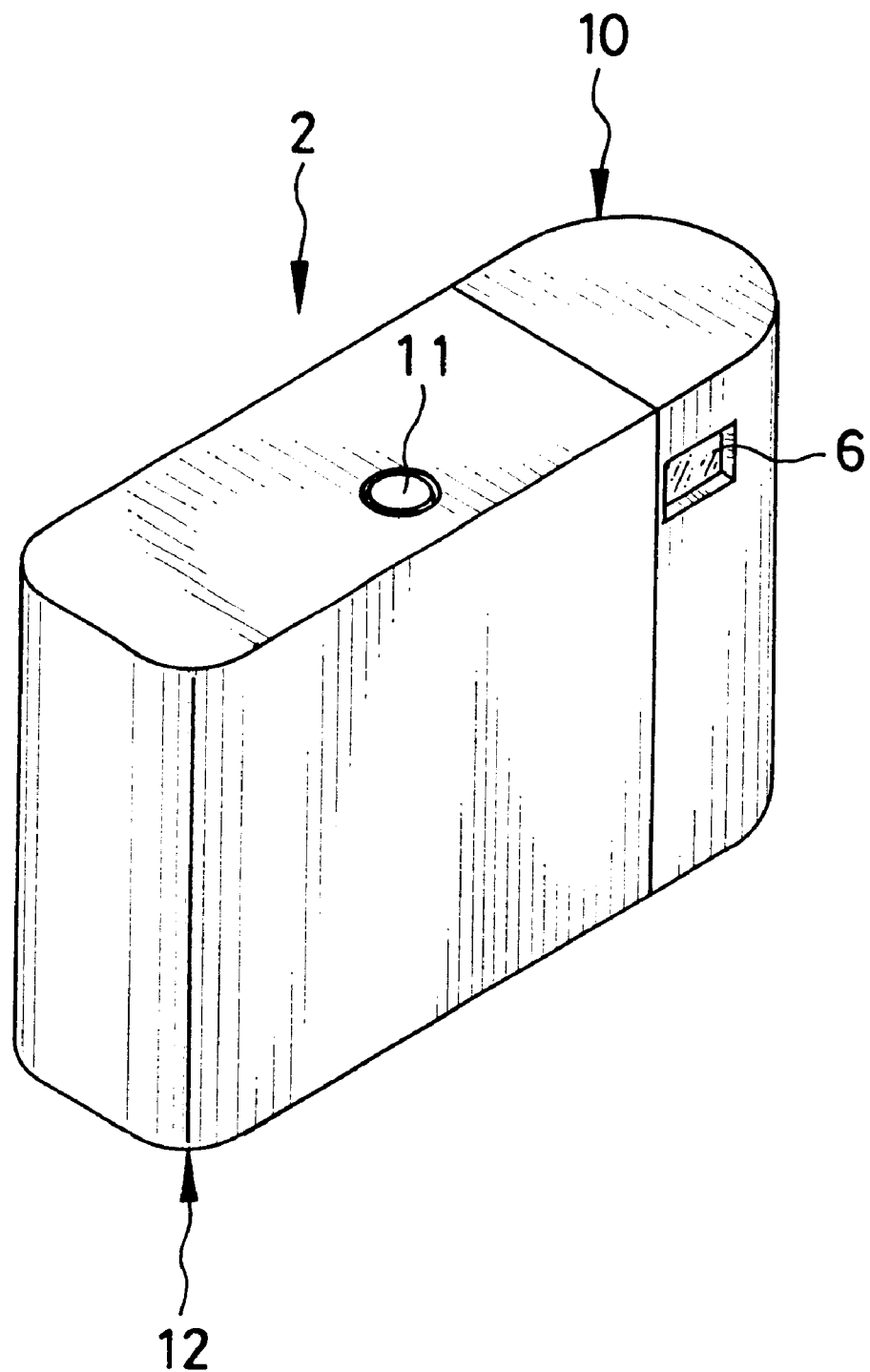
FIG. 4 is a perspective view of the camera when the slide case is set at an unused position.
Figure 5:
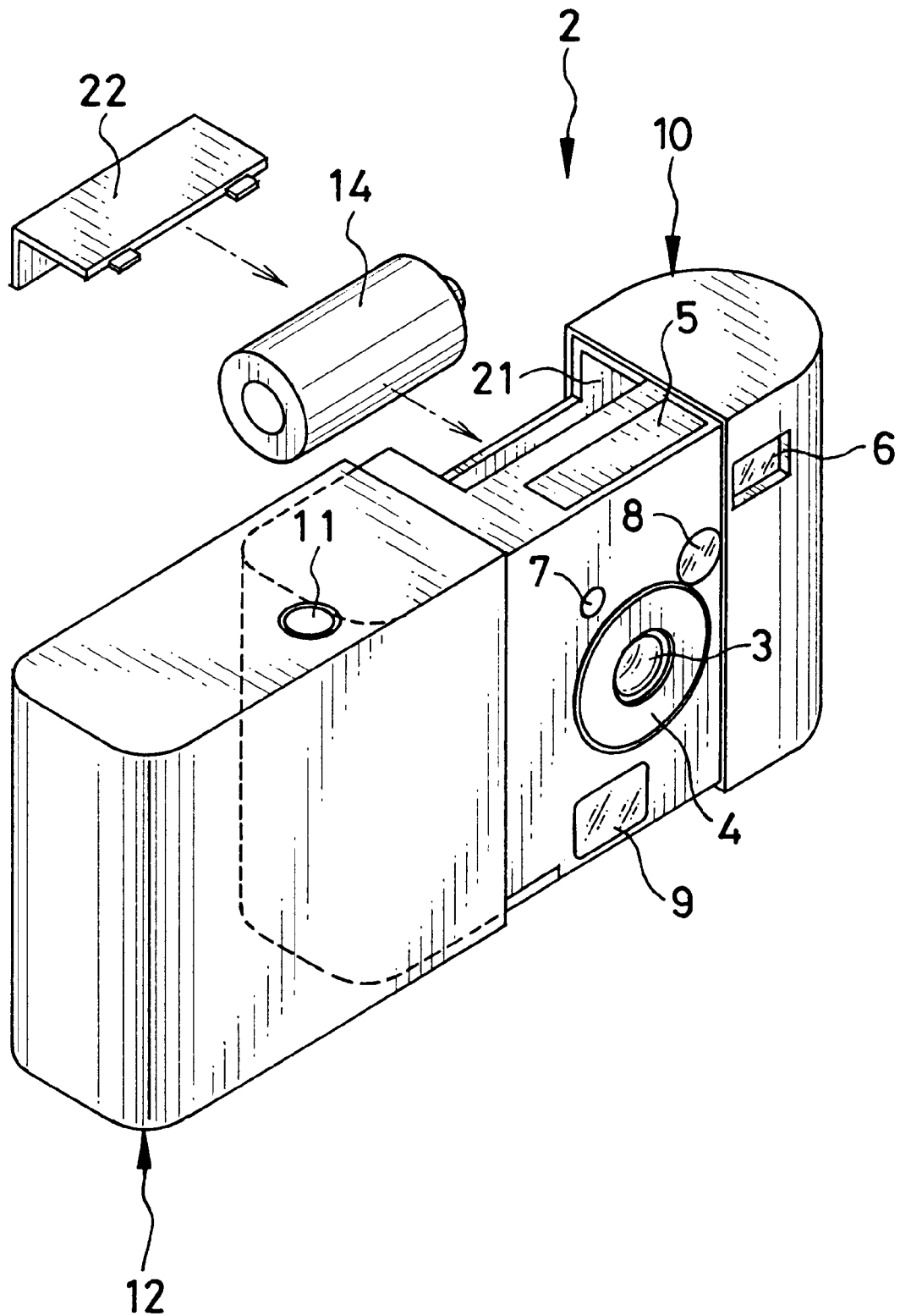
FIG. 5 is a perspective view of the camera when the slide case is set at a battery exchange position.
Figure 6:
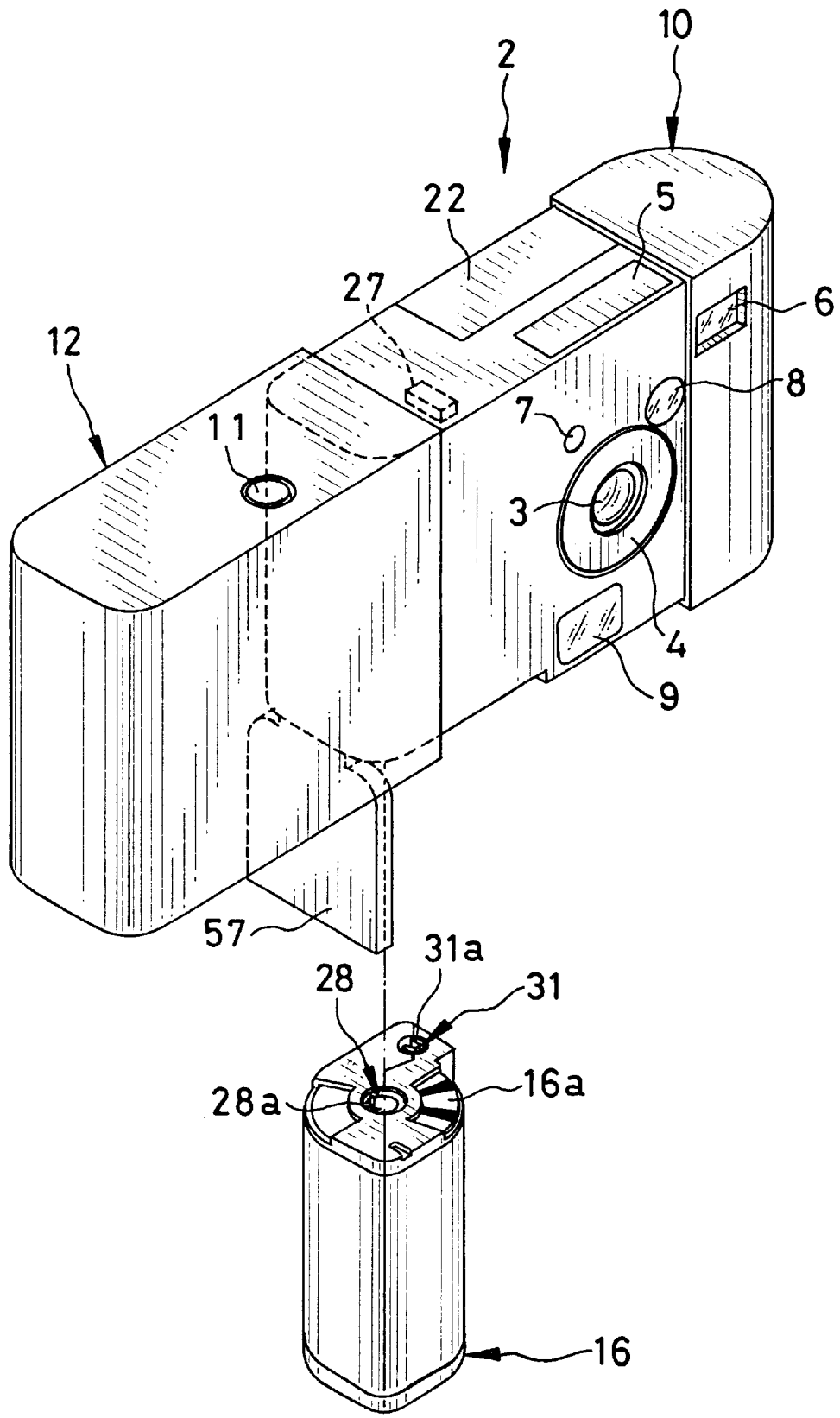
FIG. 6 is a perspective view of the camera when the slide case is set at a cartridge exchange position.

The slide case 12 is made of a light material, for example, plastic, aluminum and titanium, as single piece. The slide case 12 is movable and set at one of four positions which are a photographing position, an unused position, a battery exchange position and a cartridge exchange position. As shown in FIGS. 2 and 3, the lens barrel 4, the flash unit 5 and the liquid crystal display 13 emerge when the slide case is set at the photographing position. As shown in FIG. 4, the lens barrel 4, the flash unit 5 and the liquid crystal display 13 are covered with the slide case 12 when the slide case 12 is set at the unused position. As shown in FIG. 5, a battery 14 which is a power supply of the camera body 10 becomes exchangeable when the slide case 12 is set at the battery exchange position. As shown in FIG. 6, it is possible to load a film cartridge 16 into the camera body 10 and take out it from the camera body 10 when the slide case 12 is set at the cartridge exchange position. Thus, when the camera 2 is not used, the size of the camera 2 is reduced so that its portability is improved. Further, when a photograph is taken, it is easy to hold the camera. Further, the slide case prevents resting a finger on the taking lens 3, the flash unit 5 and so on. By the way, the taking lens 3 moves between a housing position and a protrude position in association with the slide case 12.

The slide case 12 clicks at each position so that positioning of the slide case 12 is easily performed at the position. Further, when the slide case 12 is set at the unused position, the slide case 12 covers more than two thirds of the surface area relative to five faces of the camera body 10. Thus, when the camera 2 is not used, it has a simple design and looks as a small camera having a smaller size rather than the actual size. Moreover, as the slide case 12 is not provided with a big opening, dust and the like hardly enter between the slide case 12 and the camera body 10.

Figure 7:
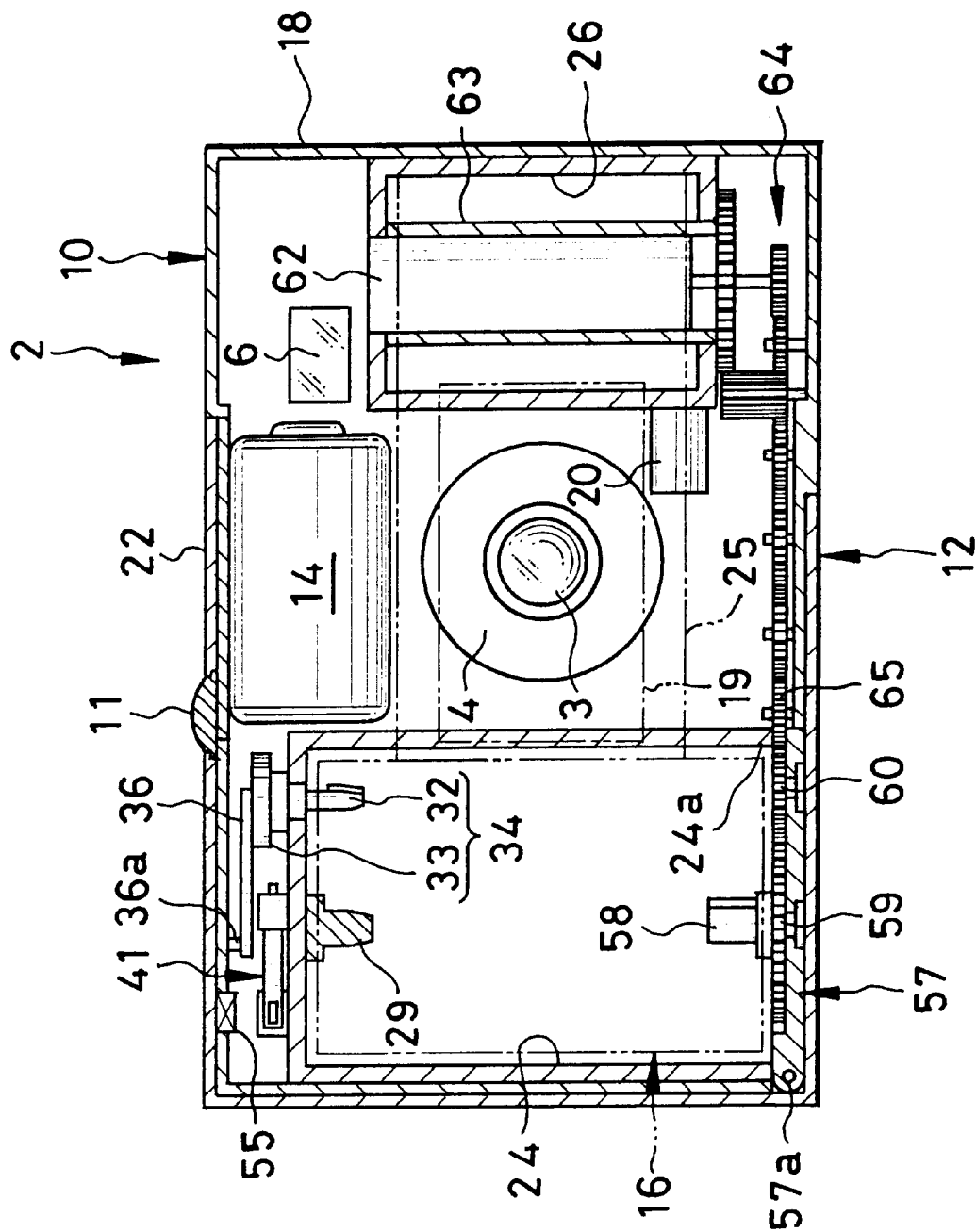
FIG. 7 is an elevational view in section of the camera when the slide case is set at the unused position.

As shown in FIG. 7, the size of the camera body 10 is reduced by disposing each part efficiently in an outer case 18 made of a light material, for example, plastic, aluminum and titanium. The lens barrel 4 holding the taking lens 3 of single focus point is disposed around a center of the camera body 10.

The lens barrel 4 protrudes to the front of the camera body 10 when the power supply switch of the camera body 10 is turned on and the lens barrel 4 is sunk into the camera body 10 when the power supply switch is turned off. At the under right side of the lens barrel 4, a motor 20 is disposed. The motor 20 moves the lens barrel 4 and performs focusing. When the taking lens 3 is a zoom lens, the motor 20 is also utilized as a motor for zooming. At the behind of the lens barrel 4, an exposure aperture 19 defining an exposure area of the photographic film is disposed as shown by tow-dotted chain line in FIG. 7.

The flash unit 5 is disposed above the lens barrel 4. The flash unit 5 is contained in the camera body 10 as shown in FIG. 5 when the power supply switch of the camera body 10 is turned off or the brightness of the object is sufficient. When the brightness of the object is low or the photographic mode is changed to a compulsory flash mode, the flash unit 5 is popped up from the camera body 10 as shown in FIG. 2. Thus, the flash unit 5 is kept apart from the taking lens 3 so that the red-eye phenomenon is prevented.

As shown in FIG. 5, a battery chamber 21 in which the battery 14 is contained is disposed behind the flash unit 5. The battery chamber 21 is covered with a battery lid 22. When the slide case 12 is set at the unused position or the photographing position, a part of the battery lid 22 is covered with the slide case 12 so that it is impossible to open the battery lid 22. Only when the slide case 12 is set at the battery exchange position or the cartridge exchange position, the battery lid 22 is openable. Thus, the battery is prevented from being carelessly exchanged in a state that the power supply of the camera 2 is on.

A cartridge chamber 24 and a film take-up chamber 26 are respectively disposed at both sides of the lens barrel 4 and the exposure aperture 19. The cartridge chamber 24 is loaded with the film cartridge 16. The film take-up chamber 26 contains the photographic film 25 drawn out from the film cartridge 16 of the cartridge chamber 24 in a roll-like state. The viewfinder 6 is disposed above the film take-up chamber 26 with a flash circuit which is not shown. Moreover, the viewfinder 6 is disposed at a portion of the camera body which is not covered with the slide case when the slide case is set at the unused position.

The cartridge chamber 24 is larger than the film cartridge 16 and has a similar shape to the cartridge 16. On an upper face of the inner wall of the cartridge chamber 24, a support shaft 29 is provided. The support shaft 29 is inserted into an engaging hole 28a (refer to FIG. 6) formed at an end of a spool 28 of the film cartridge 16. The film cartridge 16 has a light shielding lid 31 for opening and closing a film port mouth 37 (refer to FIG. 14) through which the photographic film is drawn out and pulled back. Switching means for opening and closing the light shielding lid 31 is attached to the above portion of the cartridge chamber 24.

Figure 8:
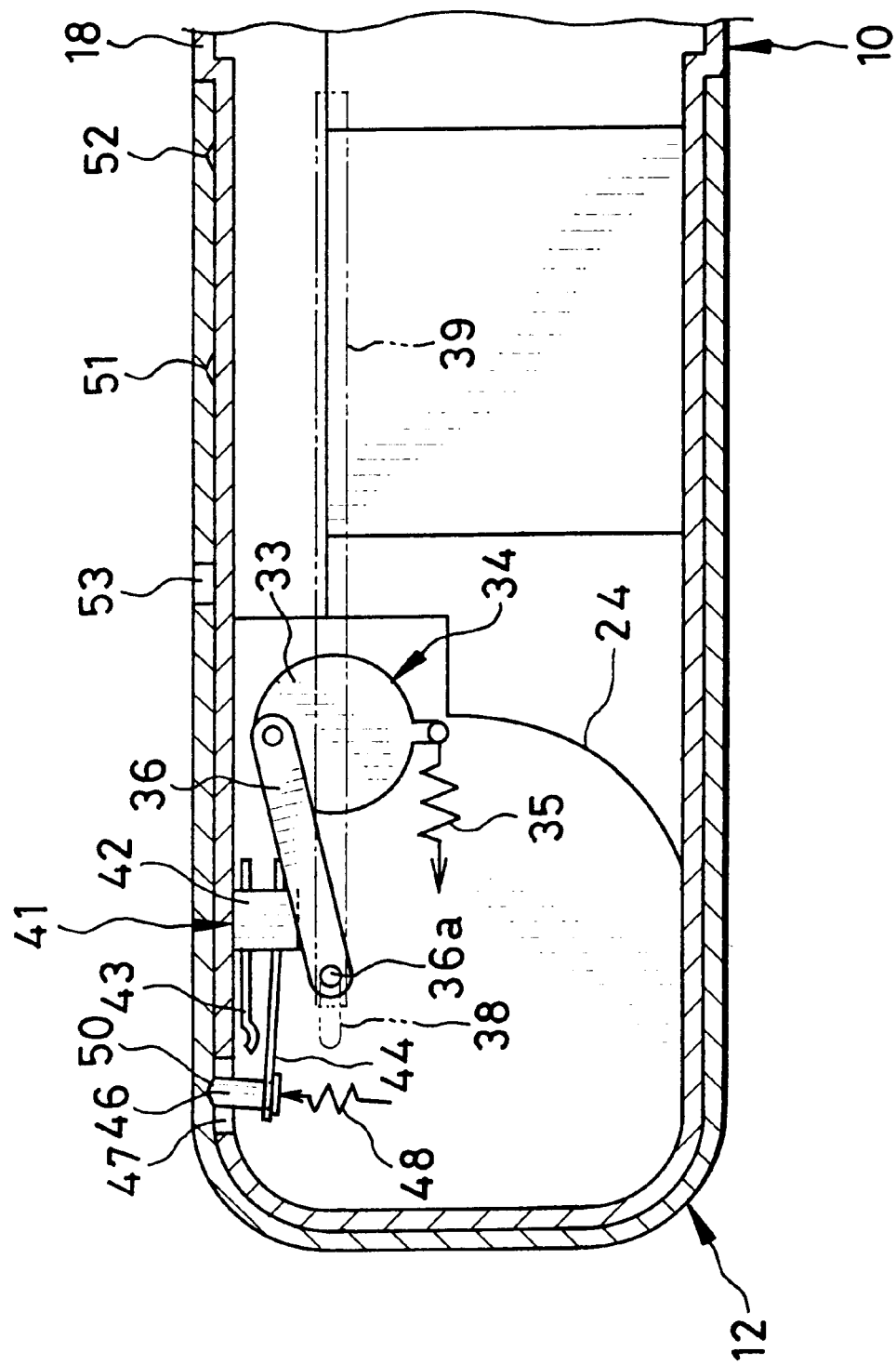
FIG. 8 is a plan view in section of the camera when the slide case is set at the unused position.

FIG. 8 is a partial sectional view showing the switching means of the light shielding lid 31 attached to the above portion of the cartridge chamber 24. The switching means is constituted of a switching member 34, a spring 35 and an interlocking lever 36. The switching member 34 comprises an engaging shaft 32 (refer to FIG. 7) provided at the lower portion thereof and a disk-like rotational plate 33 provided at the upper portion thereof. The engaging shaft 32 engages with an engaging hole 31a (refer to FIG. 6) provided at the end portion of the light shielding lid 31. The spring 35 urges the switching member 34 in clockwise direction in FIG. 8 to open the light shielding lid 31. One end of the interlocking lever 36 is rotatably attached to the rotational plate 33 of the switching member 34.

A pin 36a is formed at the other end of the interlocking lever 36. The pin 36a is inserted into a slit 38 formed on the upper face of the outer case 18. The pin 36a projects from the outer wall of the upper face of the outer case 18 by a little and a top end of the pin 36a is contained in a groove 39 formed in the inner wall of the upper face of the slide case 12. The groove 39 is formed along a slide direction of the slide case 12.

Figure 9:
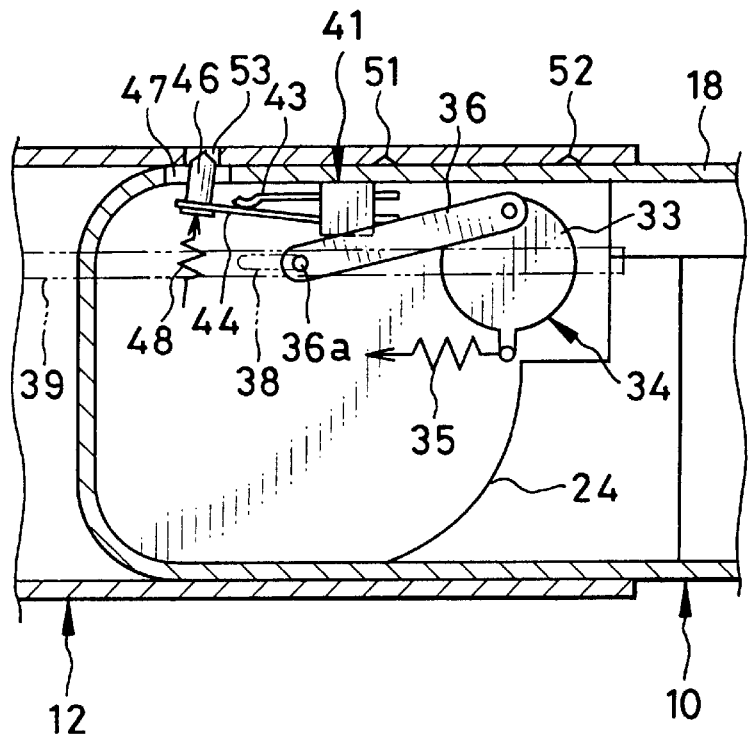
FIG. 9 is a plan view in section of the camera when the slide case is set at the photographing position.

As shown in FIGS. 8 and 9, when the slide case 12 is set at the unused position, the photographing position or the battery exchange position, the switching member 34 sets the light shielding lid 31 at an open position. The switching member 34 is urged toward the open position of the light shielding lid 31 by means of the spring 35. However, the pin 36a of the interlocking lever 36 abuts on the right end of the slit 38 in the drawings so that the rotation of the switching member 34 is inhibited. Accordingly, switching member 34 is stopped at the open position of the light shielding lid 31.

Figure 10:
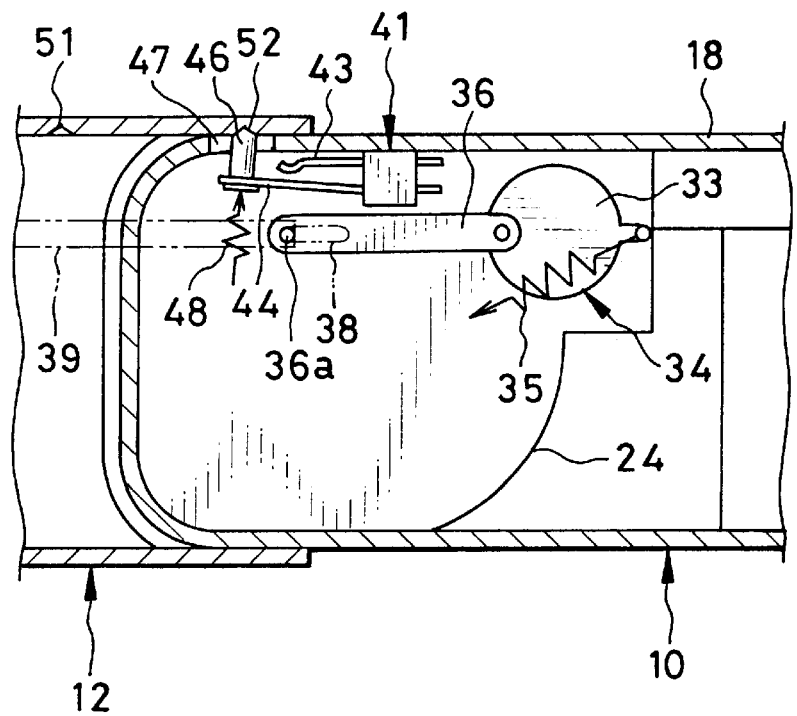
FIG. 10 is a plan view in section of the camera when the slide case is set at the cartridge exchange position.

Upon sliding the slide case 12 toward the cartridge exchange position, as shown in FIG. 10, the inner wall of the groove 39 of the slide case 12 abuts on the pin 36a of the interlocking lever 36 so that the pin 36a is slid toward the left direction in the drawing. According to movement of the interlocking lever 36, the switching member 34 is rotated toward a close position of the light shielding lid 31 against the urging of the spring 35. Thus, when the film cartridge 16 is loaded into the camera 2, the engaging shaft 32 of the switching member 34 is always adapted to engage with the engaging hole 31a of the light shielding lid 31 set at the close position. Moreover, when the film cartridge 16 is taken out from the camera 2, the light shielding lid 31 is always set at the close position.

A power supply switch 41 for turning on and off the power supply of the camera 2 is attached to the above portion of the cartridge chamber 24. The power supply switch 41 comprises two contact segments which are a fixed contact segment 43 and a movable contact segment 44. The two contact segments 43 and 44 are held by a holding member 42 which has non-conductivity and made of, for example, plastic. The fixed contact segment 43 and the movable contact segment 44 are connected to a control circuit (not shown) for carrying out various controls of the camera body 10. When the fixed contact segment 43 and the movable contact segment 44 touch, the power supply of the camera body 10 is turned on. When the fixed contact segment 43 and the movable contact segment 44 do not touch, the power supply of the camera body 10 is turned off.

A click member 46 made of plastic is attached to an end portion of the movable contact segment 44. The tip of the click member 46 has an acute angle. The click member 46 is inserted into an opening 47 formed in the rear side of the outer case 18 and urged toward the opening 47 by a spring 48 so that the click member 46 abuts on the inner wall of the rear side of the slide case 12 through the opening 47.

Notches 50, 51 and 52 and an opening 53 are respectively formed on the inner wall of the rear side of the slide case 12 and disposed at predetermined positions. When the slide case 12 is slid to the unused position, the battery exchange position or the cartridge exchange position, the click member 46 engages with one of the notches 50, 51 and 52. When the slide case 12 is set at the photographing position, the click member 46 engages with the opening 53. Thus, the slide case 12 is easily set at each position.

The slide case 12 is also used as an operating member for turning on and off the power supply switch 41 of the camera body 10. When the click member 46 abuts on the inner wall of the rear side of the slide case 12 or engages with the notches 50, 51 and 52, in other words, when the slide case 12 is set at the unused position, the battery exchange position or the cartridge exchange position, the movable contact segment 44 does not touch the fixed contact segment 43 so that the power supply of the camera body 10 is kept in off-state. As shown in FIG. 9, when the slide case 12 is slid to the photographing position, the click member 46 engages with the opening 53 of the slide case 12. At this time, the click member 46 engages with the opening 53 deep rather than the case of the notches 50, 51 and 52 so that the movable contact segment 44 touches the fixed contact segment 43 and the power supply of the camera body 10 is turned on.

A bar code sensor 27 and a spool sensor are attached to outside or inside of the upper face of the cartridge chamber 24. The bar code sensor 27 reads out content of the bar code plate 16a integrally rotated with the spool 28 of the film cartridge 16. The spool sensor detects a rotational position of the spool 28 by detecting a notch position of the bar code plate 16a. Further, a cartridge sensor detecting whether the film cartridge 16 exists in the cartridge chamber is also provided near the cartridge chamber 24. However, these sensors are used in a marketed camera, for example, "EPION 250Z" (trade name, manufactured by Fuji Photo Film Co. Ltd.) employing the film cartridge. As the sensors are well known, the detail description thereof is omitted. Further, in order to avoid the complexity of the drawings, illustration of that is omitted.

Figure 1:
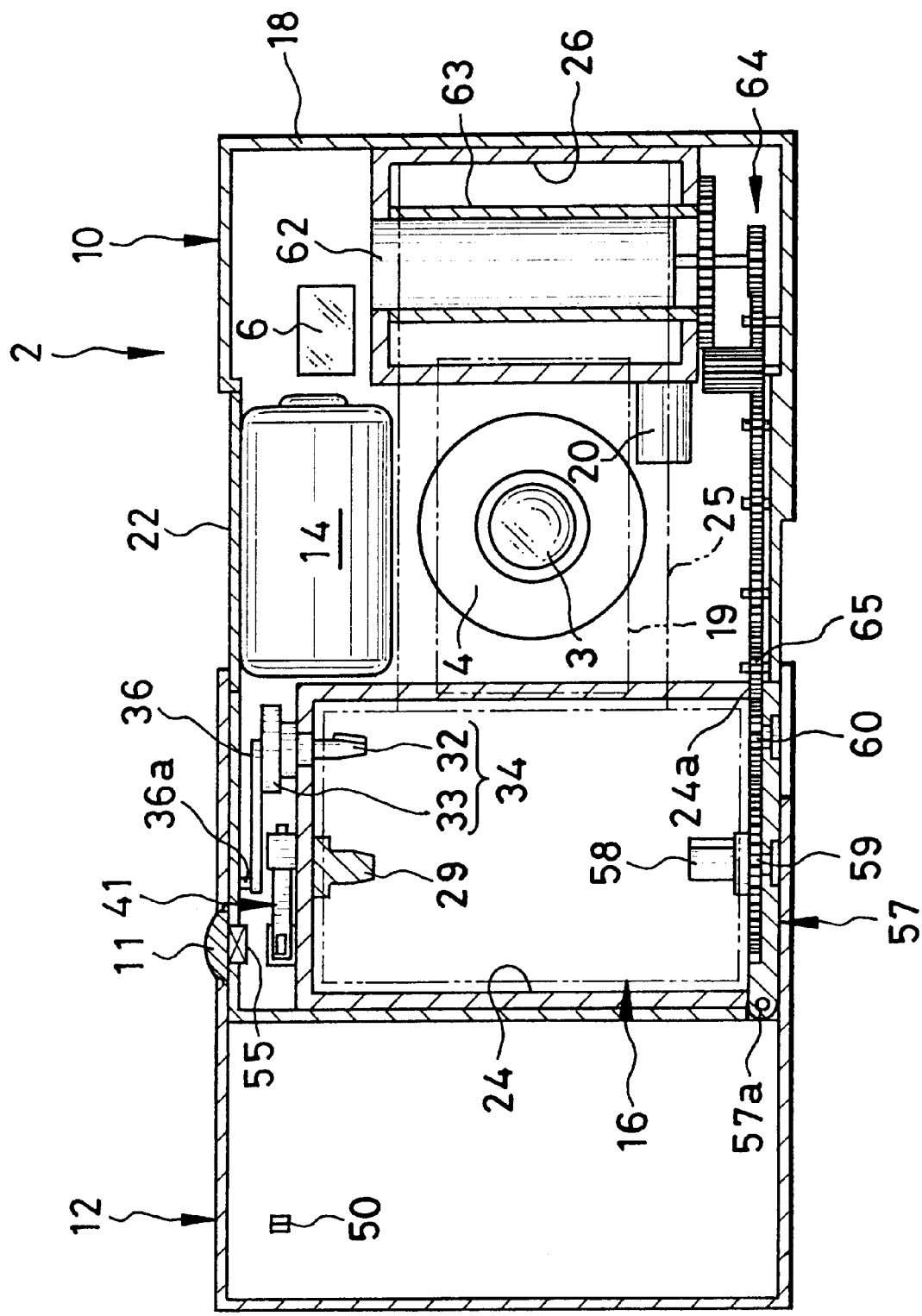
FIG. 1 is an elevational view in section of a camera when a slide case is set at a photographing position.

A micro switch 55 connected to the control circuit of the camera body 10 is attached to the upper side of the outer case 18. The micro switch 55 is used as a release switch. As shown in FIG. 1, when the slide case 12 is slid to the photographing position, the shutter button 11 is disposed above the micro switch 55 and the micro switch 55 is pressed via the shutter button 11. The shutter button 11 is attached to the slide case 12 and depressible in up-and-down direction only when the slide case 12 is slid to the photographing position.

The micro switch 55 is pressed in two steps. At first step wherein the micro switch is turned on by soft depression, focusing and photometry are performed. At second step wherein the micro switch is turned on by deep depression, shutter release is performed. When the micro switch 55 is turned on at the first step, the control circuit activates the light emitting window 8 and the light receiving window 9 to measure the distance to the object. Based on the measured distance, the taking lens 3 is moved along an optical axis 23 to adjust the focus point. At the same time, the control circuit measures the object brightness with the photometric window 7 to determine the suitable shutter speed and the stop. When the micro switch 55 is turned on at the second step, the control circuit carries out the shutter release on the basis of the shutter speed and the stop.

Figure 11:
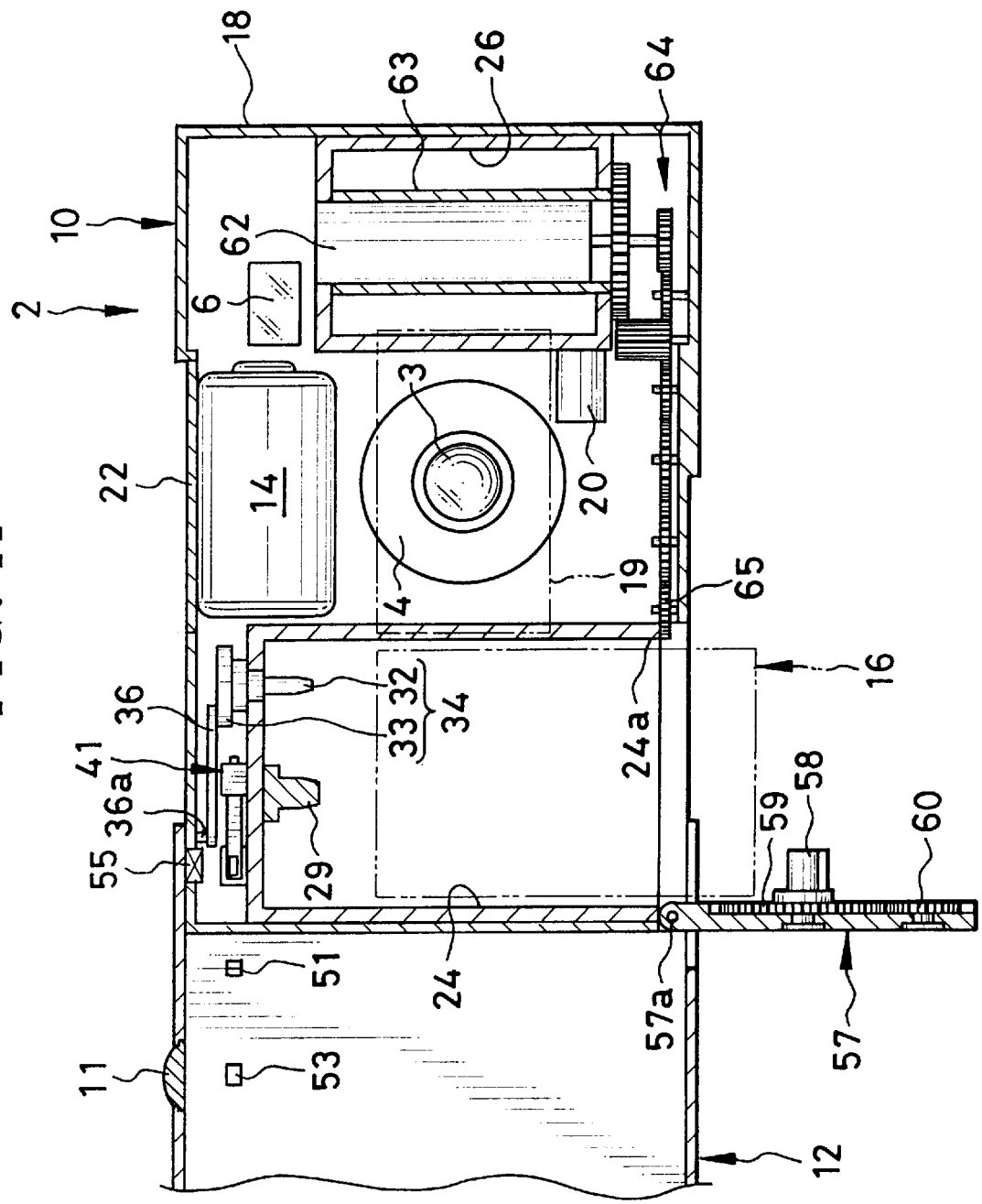
FIG. 11 is an elevational view in section of the camera when the slide case is set at the cartridge exchange position.

As shown in FIG. 11, the lower face of the cartridge chamber 24 is an opening 24a for going in an out of the film cartridge 16. The opening 24a is opened and closed by a cartridge lid 57. The cartridge lid 57 is openable because one end 57a thereof is pivotally supported by the camera body 10. The cartridge lid 57 engages with the cartridge chamber 24 when the cartridge lid 57 is closed to cover the cartridge chamber 24. The cartridge lid 57 is openable only when the slide case 12 is slid to the cartridge exchange position. Incidentally, the lower face of the slide case 12 is slightly cut out in order to open the cartridge lid 57 at the cartridge exchange position.

A drive shaft 58, a drive gear 59 and a connecting gear 60 are rotatably attached to the inside of the cartridge lid 57. The drive shaft 58 engages with the engaging hole 28a of the spool 28 of the film cartridge 16. The drive gear 59 is united with the drive shaft 58. The connecting gear 60 couples the drive gear 59 with a drive transporting mechanism of the camera body 10 when the cartridge lid 57 is closed.

The drive transporting mechanism comprises a motor 62, a take-up roller 63 and a gear train 64. The motor 62 is disposed in the film take-up chamber 26. The take-up roller 63 is rotatably attached to the outside of the motor 62. The gear train 64 is constituted of a plurality of gears and transports the rotation of the motor 62 to the take-up roller 63 and the drive gear 59 of the cartridge lid 57. The gear train 64 is attached to the bottom face of the camera body 10. When the cartridge lid 57 is closed, the connecting gear 60 meshes with an end gear 65 of the gear train 64.

The drive transporting mechanism rotates the spool 28 of the film cartridge 16 in film advancing direction via the motor 62, the gear train 64, the connecting gear 60, the drive gear 59 and the drive shaft 58 to advance the photographic film 25 from the film cartridge 16. The advanced photographic film 25 reaches to the film take-up chamber 26 and is wound around the take-up roller 63. At this time, the take-up roller 63 winds the photographic film 25 at higher speed than advancing speed of the photographic film 25. Then the gear train 64 stops the driving for the spool 28, and after that, the photographic film 25 is wound by the rotation of the take-up roller 63 alone.

The end gear 65 of the gear train 64 is adapted to slide in up-and-down direction along the its rotational axis and urged toward under direction by means of a spring. Thus, if a tooth of the connecting gear 60 collides with a tooth of the end gear 65 when the cartridge lid 57 is closed, the end gear 65 is pressed by the connecting gear 60 and slide in upper direction. Accordingly, the cartridge lid 57 may be closed without taking the stop position of each gear into consideration. When the end gear 65 is rotated by the motor 62 and set in a state that the end gear 65 is capable of meshing with the connecting gear 60, the end gear 65 is slid in under direction by the urging of the spring to mesh with the connecting gear 60.

When the slide case 12 is set at the unused position, the photographing position or the battery exchange position, at least a part of the cartridge lid 57 is covered with the slide case 12 so that the cartridge lid 57 is not openable. While the photographic film 25 is advanced from the film cartridge 16, it is impossible to slide the slide case 12 to the cartridge exchange position. In the state that the photographic film 25 is drawn out, the light shielding lid 31 can not rotate to the close position so that the switching member 34 engaging with the light shielding lid 31 can not also rotate. Accordingly, if the pin 36a of the interlocking lever 36 connected to the switching member 34 is pressed by the groove 39, the pin 36a is not slid. Thus, in the camera 2, a lock mechanism of the cartridge lid 57 interlocking with the opening of the light shielding lid 31 is not necessary. Accordingly, it is possible to reduce the size of the camera body 10 by thinning the cartridge lid 57 and to reduce the camera cost by reduction of parts.

Next, an operation of the above embodiment is described. As shown in FIG. 4, when the camera 2 is not used, the slide case 12 is slid to the unused position so as to cover the lens barrel 4, the flash unit 5 and the front of the liquid crystal display 13. In this state, more than two thirds of the surface area relative to five faces of the camera body 10 is covered so that dust or the like are prevented from the entering between the camera body 10 and the slide case 12. Further, portability of the camera 2 is improved.

As shown in FIG. 7, the shutter button 11 is apart from the micro switch 55 of the camera body 10 so that if the shutter button 11 is depressed by mistake, photographing is not performed. Further, as shown in FIG. 8, the click member 46 of the power supply switch 41 engages with the notch 50 by means of the spring 48 to retain the slide case 12 at the unused position. The movable contact segment 44 constituting the power supply switch 41 does not touch the fixed contact segment 43 so that the power supply of the camera 2 is kept in an off-state.

When the film cartridge 16 is loaded into the camera 2, the slide case 12 is slid to the cartridge exchange position as shown in FIGS. 6, 10 and 11. At the cartridge exchange position, the click member 46 engages with the notch 52. Moreover, the power supply switch 41 is not turned on similarly to the above case that the slide case 12 is set at the unused position.

Upon sliding the slide case 12 to the cartridge exchange position, the inner wall of the groove 39 provided on the inner wall of the upper side of the slide case 12 abuts on the pin 36a of the interlocking lever 36 attached to the upper portion of the cartridge chamber 24. Accordingly, as shown in FIG. 10, the pin 36a is slid in a left direction within the slit 38 provided on the inner wall of the upper side of the outer case 18. Thus, the interlocking lever 36 is moved in the similar direction. The switching member 34 to which the other end of the interlocking lever 36 is swingably attached rotates against the urging of the spring 35 and set in a state that the switching member 34 is capable of engaging with the engaging hole 31a of the closed light shielding lid 31 of the film cartridge 16.

The cartridge lid 57 is opened to expose the opening 24a and the film cartridge 16 is inserted into the cartridge chamber 24 along its axis direction. Thus, the support shaft 29 is inserted into the engaging hole 28a of the spool 28 of the film cartridge 16 and the engaging shaft 32 provided at the low portion of the switching member 34 engages with the engaging hole 31a of the light shielding lid 31.

Upon closing the cartridge lid 57, the drive shaft 58 of the cartridge lid 57 engages with the engaging hole 28a of the spool 28. When the cartridge lid 57 is closed, the tooth of the connecting gear 60 of the cartridge lid 58 sometimes collide with the tooth of the end gear 65 constituting the gear train 64 of the camera body 10. However, when the end gear 65 is pressed by the connecting gear 60, the end gear 65 is slid in above direction so that the cartridge lid 57 may be closed without considering the stop state of each gear.

Upon closing the cartridge lid 57 and sliding the slide case 12 to the photographing position as shown in FIGS. 1, 2, 3 and 9, the pin 36a of the interlocking lever 36 is gradually released from pressing by the groove 39. Thus, switching member 34 rotates toward the open position of the light shielding lid 31 by means of the spring 35 so that the light shielding lid 31 is opened via the engaging shaft 32.

When the slide case 12 is slid to the photographing position, the click member 46 constituting the power supply switch 41 engages deep with the opening 53 of the slide case 12. Thus, the movable contact segment 44 touches the fixed contact segment 43 so that the power supply of the camera body 10 is turned on.

When the power supply of the camera body 10 is turned on, the control circuit detects the film cartridge 16 loaded into the cartridge chamber 24 by the cartridge sensor. Further, the rotational position of the spool 28 is detected by the spool sensor. From the rotational position, the loaded film cartridge 16 is identified whether it is unused or not.

When the film cartridge 16 is detected and it is unused, the spool 28 is rotated in the film advancing direction via the motor 62, the gear train 64, the connecting gear 60, the drive gear 59 and the drive shaft 58 to advance the photographic film 25 from the port mouth 37. The control circuit reads out the bar code of the bar code plate 16a by the bar code sensor 27 during film advancement. The contents of the bar code are sensitivity of the photographic film 25, photographable number and so forth. The data is recorded in the memory of the control circuit and used for various control when the photograph is taken.

The photographic film 25 advanced from the film port mouth 37 passes through the behind of the exposure aperture 19 and reaches to the film take-up chamber 26. The leading edge of the photographic film 25 is wound around the take-up roller 63. The take-up roller 63 winds the photographic film 25 at the faster speed than the advancing speed of the photographic film 25. Thus, the gear train 64 stops to drive the spool 28. After that, the photographic film 25 is wound by the rotation of the take-up roller 63 alone and first frame of the photographic film 25 is set behind the exposure aperture 19.

The slide case 12 is used as a grip and composition is confirmed by viewing the viewfinder. Therefore, it is prevented that the finger rests on the taking lens 4 and the flash unit 5. Moreover, when the slide case 12 is set at the photographing position, the shutter button 11 is disposed above the micro switch 55 so that it is possible to depress the shutter button. Upon depressing the shutter button 11 softly, the micro switch 55 is turned on at the first step.

When the on-signal generated at the first step of the micro switch 55 is inputted into the control circuit, the control circuit activates the light emitting window 8 and the light receiving window 9 to measure the distance to the object and adjusts the focus point by moving the taking lens 3 in the lens barrel 4. At the same time, photometry of the object brightness is carried out via the photometric window 7. When the object brightness is low or the compulsory flash mode is selected, the flash unit 5 pops out of the camera body 10.

Upon depressing the shutter button 11 deep, the micro switch 55 is turned on at the second step. When the on-signal generated at the second step of the micro switch 55 is inputted into the control circuit, the control circuit causes an electronic shutter device disposed behind the taking lens 3 to perform shutter release. At the same time, the flash unit 5 is fired toward the object. After the shutter release was over, the control circuit rotates the take-up roller 63 to wind the photographic film 25 in the film take-up chamber 26.

When an indication for noticing the reduction of the battery 14 is displayed on the liquid crystal display during the photographing, the slide case 12 is slid to the battery exchange position shown in FIG. 5. Thus, the battery lid 22 is not covered with the slide case 12 so that the battery lid 22 can be detached from the camera body 10. After the battery lid 22 was detached, the consumed battery 14 is taken out from the battery chamber 21. The new battery 14 is set in the battery chamber 21 and the battery lid 22 is attached. Further, the slide case 12 is slid to the photographing position again. Then, the photographing may be performed successively.

When the slide case 12 is set at the unused position, the photographing position or the battery exchange position, the cartridge lid 57 is not openable because the cartridge lid 57 is partially covered with the slide case 12. Moreover, when the slide case 12 is slid toward the cartridge exchange position in a state that film cartridge 16 is loaded, the slide case 12 is inhibited to slide on the way because the switching member 34 engaging with the light shielding lid 31 can not rotate. Accordingly, the cartridge lid 57 is not still openable. Thus, the cartridge lid 57 is prevented from opening by mistake so that the photographic film 25 is not exposed.

When the photographing for all frames of the photographic film 25 is over, the control circuit actuates the drive transporting mechanism to wind back the photographic film 25 in the film cartridge 16. The rotational position of the spool 28 is detected by the spool sensor while the photographic film 25 is wound back and the spool 28 is stopped such as to indicate that the photographic film 25 of this film cartridge 16 has already been exposed. After confirming that the motor 62 of the camera body 10 stops and the winding back of the photographic film 25 is over, the slide case 12 is slid to the cartridge exchange position.

The inner wall of the groove 39 provided on the inner wall of the upper side of the slid case 12 abuts on the pin 36a of the interlocking lever 36 attached to the upper portion of the cartridge chamber 24. The pin 36a is slid in left direction (refer to FIGS. 9 and 10) within the slit 38 provided at the upper face of the outer case 18. Thus, the interlocking lever 36 is also moved in the same direction and the switching member 34 to which one end of the interlocking lever 36 is swingably attached is rotated against the urging of the spring 35. Accordingly, the light shielding lid 31 of the film cartridge 16 is closed. After that, the cartridge lid 57 is opened and the film cartridge 16 in which the exposed photographic film 25 is wound up is taken out from the cartridge chamber 24.

In case the cartridge lid 57 is opened in a state that the opening 24a of the cartridge chamber 24 faces in under direction, the drive shaft 58 is kept to engage with the spool 28 so that the cartridge lid 57 is not perfectly opened. Accordingly, the film cartridge 16 is prevented from being dropped by mistake.

Figure 12:
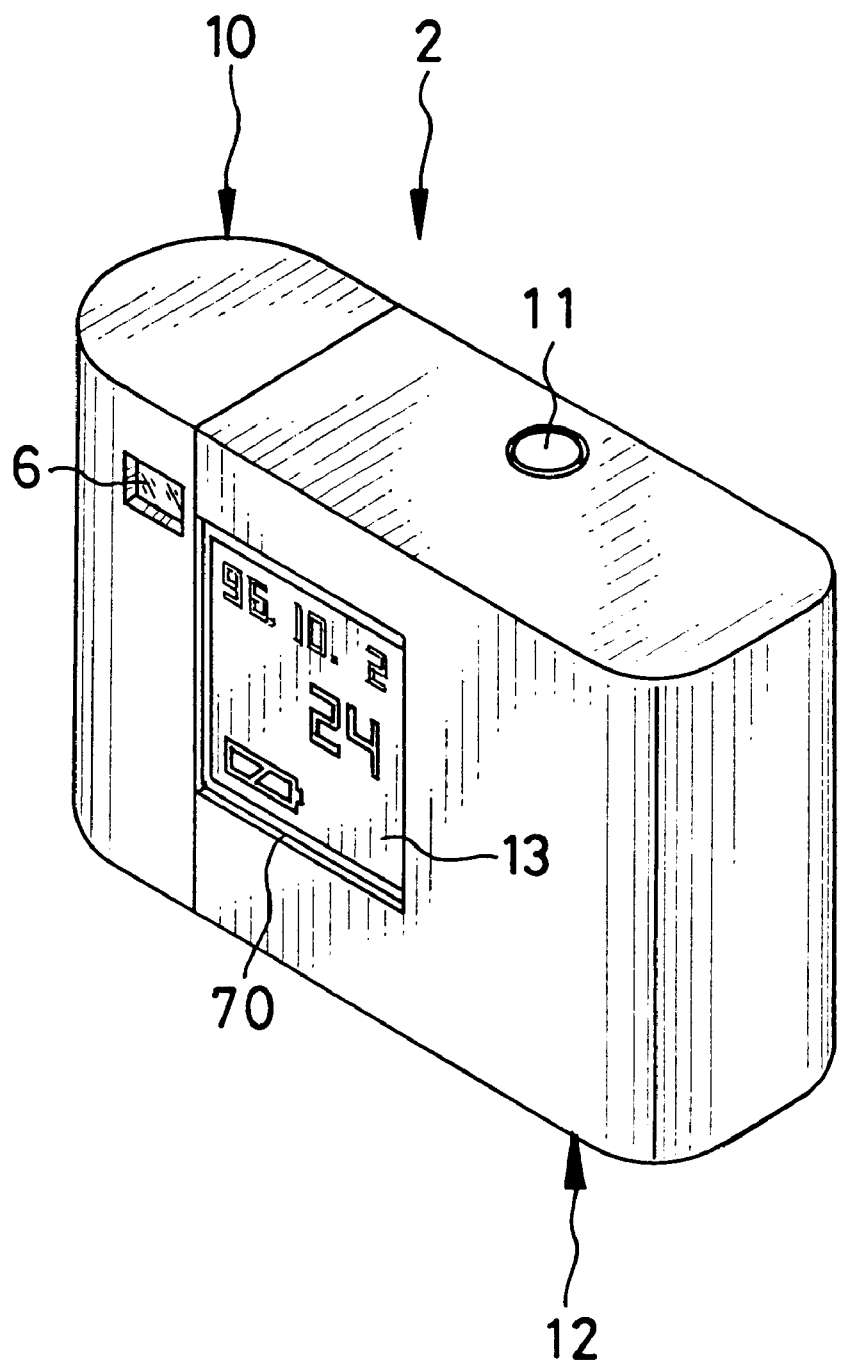
FIG. 12 is a perspective view of the rear side of the camera according to another embodiment of the present invention.

In the above-described embodiment, when the slide case 12 is slid to the unused position, the liquid crystal display 13 of rear side of the camera body 10 is covered with the slide case 12. However, as shown in FIG. 12, an opening 70 may be formed at the rear face of the slide case 12. In this case, the liquid crystal display 13 emerges from the opening 70 when the slide case 12 is set at the unused position. Accordingly, the photographic number of the film may be confirmed when the camera 2 is set in the unused state.

In the above embodiment, the power supply switch associating with the slide of the slide case is integrally provided with the click means for retaining the slide case at each position. However, these may be separately provided. The battery exchange position and the cartridge exchange position may be changed according to the arrangement of the battery of the camera body. Further, in the above embodiment, the light shielding lid is opened and closed in association with the slide of the slide case to the cartridge exchange position. However, the slide position of the slide case may be detected by a sensor and the light shielding lid may be opened and closed by a motor and so forth.

Figure 13:
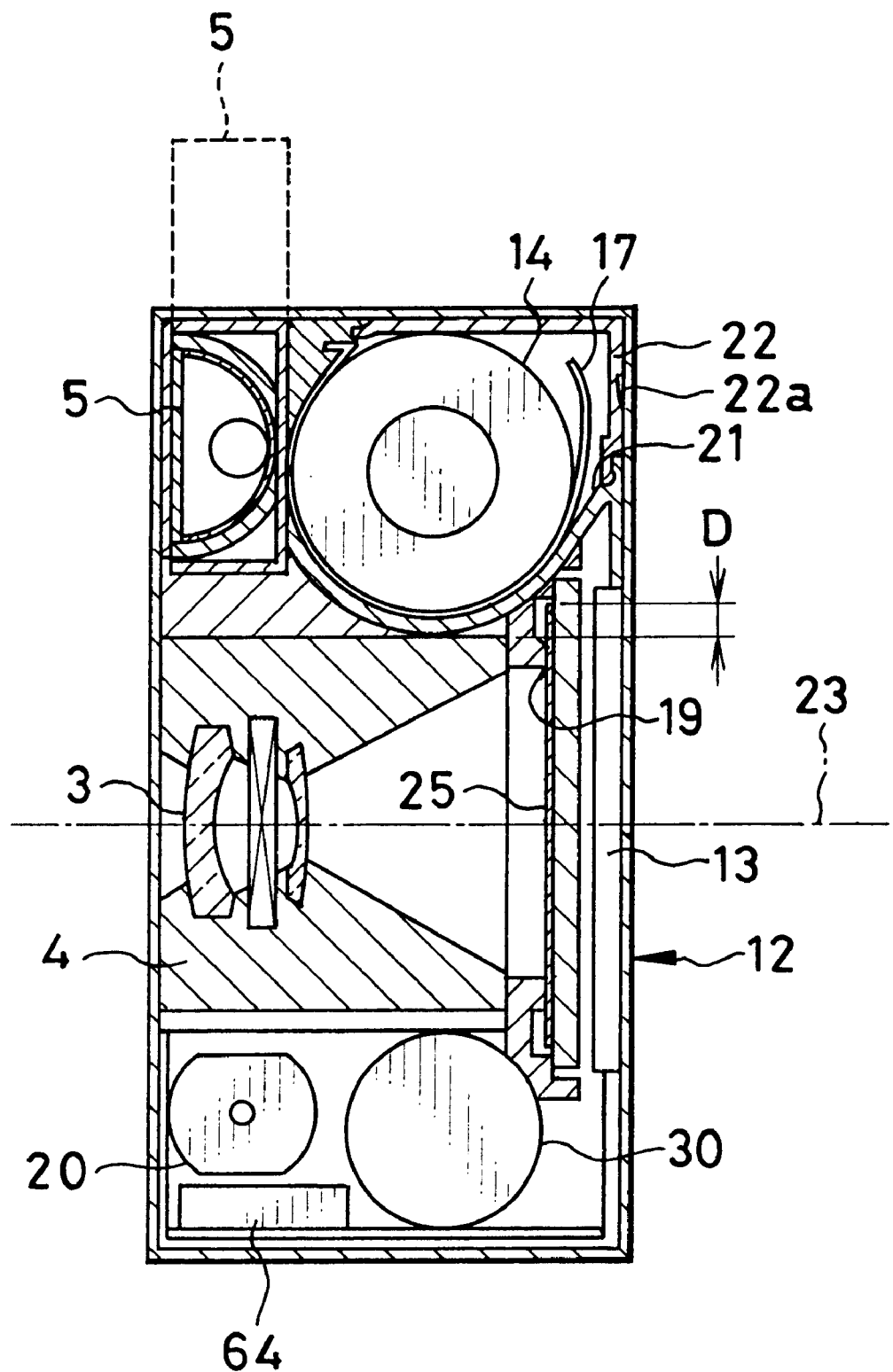
FIG. 13 is a sectional side elevational view of the camera.
Figure 14:
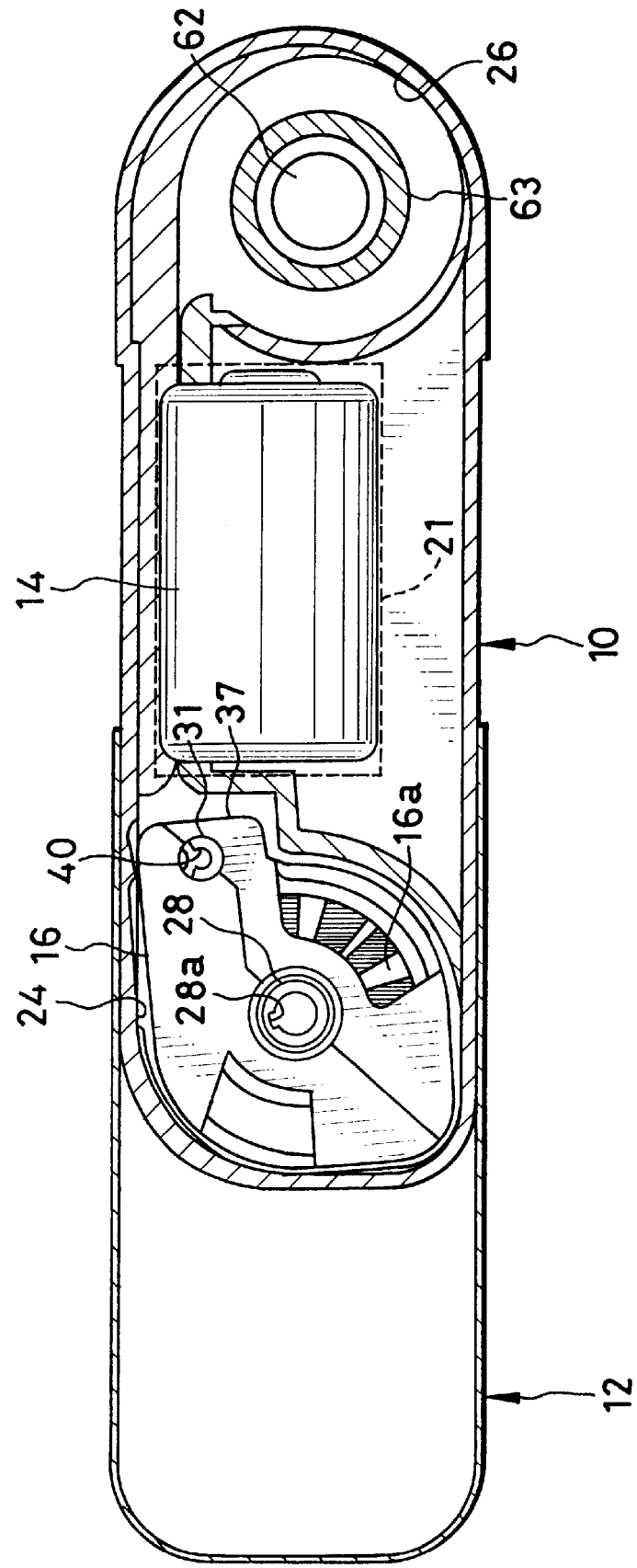
FIG. 14 is a horizontal sectional view of the camera.

As described above, the battery chamber 21 containing the battery 14 is disposed at the portion which is above portion of the camera body 10 and the rear portion of the flash unit 5 (refer to FIGS. 5, 13 and 14). The battery lid 22 is removably attached to the battery chamber 21 with engaging claws. The battery lid 22 has a L-like shape and is provided with a semicircular recess 22a (refer to FIG. 3) for engaging a finger. The recess 22a is provided above the liquid crystal display 13. The battery lid 22 is prevented from opening when the slide case 12 is set at the position shown in FIG. 3, because the battery lid 22 is covered with the slide case 12. When the slide case 12 is pulled as shown in FIG. 5, the battery lid 22 becomes openable.

As shown in FIG. 13, the battery chamber 21 containing the battery 14 is disposed above the exposure aperture 19 defining an exposure area of the photographic film 25. In a general compact camera, a finder optical system, an automatic focusing mechanism and so forth are disposed above the exposure aperture 19. However, in the present invention, the light emitting window 8 and the light receiving window 9 for automatic focusing are respectively disposed at the diagonal upper portion of the taking lens 3 and at the diagonal lower portion of the taking lens 3. In other words, the light receiving window 9 is disposed at the lower position than that of the exposure aperture 19. Further, the viewfinder, the size of which is reduced, is disposed above the film take-up chamber 26. Thus, space is formed above the exposure aperture 19. The battery chamber 21 is disposed at the space. Accordingly, height of the camera 2 may be lowered more than that of a camera in which the battery chamber 21 is provided above or under the film take-up chamber 26.

Further, in the present embodiment, the height of the camera 2 is lowered by putting the battery chamber 21 close to the exposure aperture 19. The battery chamber 21 overlaps with a side of the photographic film 25 which is out of the exposure area thereof. The battery chamber 21 overlaps with the side of the photographic film 25 by distance D shown in FIG. 13 relative to vertical direction of the camera 2. In other words, the battery chamber 21 is provided in the camera body such that an outer wall of the battery chamber 21 is disposed close to the optical axis 23 more than the side of the photographic film 25. Incidentally, the optical axis of the taking lens 3 coincides with a center of the exposure aperture 19.

Moreover, the battery chamber 21 is disposed so as to be included within the lateral length of the exposure aperture 19. Accordingly, the battery chamber 21 does not interfere with the film take-up chamber 26 so that it becomes possible to lower the height of the camera 2.

A ribbon 17 which is well known is provided inside of the battery chamber 21. The ribbon 17 is caught between the bottom face of the battery chamber 21 and the battery 14. One end of the ribbon 17 is fixed. A pair of electrode for contacting both terminals of the battery 14 are provided at both inner sides of the battery chamber 21. At least one of the electrodes has springy property.

When the battery 14 is exchanged, the slide case 12 is moved to the battery exchange position as shown in FIG. 5. Thus, the whole of the battery lid 22 emerges. The battery lid 22 is easily detached by engaging the finger with the recess 22a and pulling it up so that the battery chamber 21 is bared. After that, by pulling the ribbon 17, the old battery 14 is lifted. The lifted battery 14 is caught by the fingers and pulled out from the battery chamber 21. A new battery is loaded into the battery chamber 21 such as to catch the ribbon 17 with the bottom face of the battery chamber 21 and each terminal of the battery 14 contacts the electrode of each side of the battery chamber 21. After that, the opening of the battery chamber 21 is covered with the battery lid 22. Upon pressing the battery lid 22 strongly, the battery lid 22 is locked by the engaging claws.

The present invention is also available for a camera employing a conventional film cassette called 135-type.

In the above-described embodiment, the shutter button 11 is attached to the slide case 12. However, the shutter button 11 may be omitted. At this time, the slide case 12 is provided with an opening through which the micro switch 55 is directly depressed. Moreover, the slide case 12 may be cover the whole of the camera body 10. Further, when the opening 70 is formed at the rear face of the slide case 12 as shown in FIG. 12, a transparent plate may be attached to the opening 70.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A camera, comprising:
    a camera body having an exposure aperture, a cartridge chamber and a film take-up chamber, said cartridge chamber and said film take-up chamber being respectively disposed at both sides of said exposure aperture;
    a taking lens disposed on a front face of said camera body so as to position in front of said exposure aperture;
    a cartridge lid opened and closed when a film cartridge is loaded into said cartridge chamber; and
    a slide case slidably attached to said camera body, said slide case moving to three positions which are an unused position where said taking lens is covered with said slide case, a photographing position where said taking lens emerges and a cartridge exchange position where said cartridge lid is openable, wherein said slide case covers at least a part of said cartridge lid in order to prevent said cartridge lid from opening when said slide case is set at said unused position and said photographing position.

2. A camera according to claim 1, wherein said camera body has an approximately parallelepiped shape relative to a portion from said taking lens to said cartridge chamber, and said slide case has a complementary parallelepiped shape, one side of which is open, so that said slide case contains said approximately parallelepiped shape portion.

3. A camera according to claim 2, further comprising:
   a battery chamber formed in said camera body and above said exposure aperture; and
   a battery lid opened and closed when a battery is inserted into said battery chamber,
   said slide case further moving to a battery exchange position where said battery lid is openable, and said battery exchange position being located between said photographing position and said cartridge exchange position.

4. A camera according to claim 3, further comprising:
   a power supply switch unit turned on when said slide case is set at said photographing position for activating a camera mechanism.

5. A camera according to claim 4, wherein said slide case covers at least a part of said cartridge lid in order to prevent said cartridge lid from opening when said slide case is set at said unused position, said photographing position and said battery exchange position.

6. A camera according to claim 5, wherein said slide case covers more than two thirds of a surface area of said camera body.

7. A camera according to claim 5, wherein said cartridge lid is provided at a bottom of said camera body, and said film cartridge has a light shielding lid for opening and closing a film port.

8. A camera according to claim 7, further comprising:
   light shielding lid switching means for opening and closing said light shielding lid in association with said slide case,
   said light shielding lid switching means keeping said light shielding lid at a close position when said slide case is set at said cartridge exchange position, and keeping said light shielding lid at an open position when said slide case is set at positions except said cartridge exchange position.

9. A camera according to claim 5, wherein said slide case has a shutter button operated for photographing and said camera body has a release switch facing said shutter button when said slide case is set at said photographing position, said release switch being turned on and off by said shutter button to perform shutter release.

10. A camera according to claim 5, further comprising:
    a flash unit disposed in front of said battery chamber and popped up from said camera body in association with said slide case,
    said flash unit being contained in said camera body in a state that said flash unit is covered with said slide case when said slide case is set at said unused position, and said flash unit being popped up from said camera body when said slide case moves from said unused position to said photographing position.

11. A camera according to claim 5, wherein said taking lens moves between a housing position and a protrude position in association with said slide case, said taking lens being set at said housing position and contained in said camera body when said slide case is set at said unused position, said taking lens moving from said housing position to said protrude position when said slide case moves from said unused position to said photographing position, at said protrude position, said taking lens protruding from said camera body.

12. A camera according to claim 5, further comprising a display and a plurality of switch buttons disposed at a rear face of said camera body, said display and said switch buttons being covered with said slide case when said slide case is set at said unused position and emerging when said slide case is set at said photographing position.

13. A camera according to claim 5, further comprising a viewfinder disposed at a portion of said camera body which is not covered with said slide case when said slide case is set at said unused position.

14. A camera according to claim 13, wherein a side of said film take-up chamber emerges from said slide case when said slide case is set at said unused position, and said viewfinder is disposed above said film take-up chamber.

15. A camera according to claim 5, further comprising a window for measuring a distance, said window being provided on said camera body and under said taking lens.

16. A camera according to claim 5, wherein said power supply switch unit comprises a fixed contact segment, a movable contact segment disposed opposite to said fixed contact segment and having a springy property, and a click pin attached to one end of said movable contact segment,
    said slide case having a plurality of notches for positioning said slide case at said unused position, said battery exchange position and said cartridge exchange position, further, said slide case having a hole for keeping said slide case at said photographing position in a state that said movable contact segment contacts said fixed contact segment.

17. A camera according to claim 5, wherein an optical axis of said taking lens coincides with a center of said exposure aperture and said battery chamber is provided in said camera body such that an outer wall of said battery chamber is disposed close to said optical axis more than a side of a photographic film drawn out from said film cartridge.

18. A camera according to claim 5, further comprising a display disposed at a rear face of said camera body, said slide case being formed with an opening for exposing said display when said slide case is set at said unused position.

* * * * *